United States Patent [19]

Nagasaka

[11] Patent Number: 4,940,284

[45] Date of Patent: Jul. 10, 1990

[54] SEAT FOR AUTOMOBILE

[75] Inventor: Youetsu Nagasaka, Fujisawa, Japan

[73] Assignee: Shiroki Corporation, Fujisawa, Japan

[21] Appl. No.: 384,600

[22] Filed: Jul. 25, 1989

[30] Foreign Application Priority Data

May 8, 1989 [JP] Japan .................................... 1-52829

[51] Int. Cl.$^5$ ................................................ A47C 7/46
[52] U.S. Cl. ................................. 297/284; 297/312
[58] Field of Search ................................. 297/284, 312

[56] References Cited

U.S. PATENT DOCUMENTS

| | | | |
|---|---|---|---|
| 4,148,522 | 4/1979 | Sakurada et al. | 297/284 |
| 4,295,681 | 10/1981 | Gregory | 297/284 |
| 4,296,965 | 10/1981 | Sakurada et al. | 297/284 |
| 4,693,513 | 9/1987 | Heath | 297/284 |
| 4,832,400 | 5/1989 | Aoki et al. | 297/284 |

Primary Examiner—Peter R. Brown
Attorney, Agent, or Firm—Schwartz & Weinrieb

[57] ABSTRACT

A seat for an automobile or the like includes a seat cushion; a seat back connected to the seat cushion, a space being formed within a lower portion thereof; a rod pivotably interposed between opposite side frames of the seat back; a hip support secured an intermediate portion of the rod and disposed within the space provided within the seat back; a support or pressure board disposed upon a support frame provided within the hip support, in such a manner as to be inclined back and forth, an upper portion of the board serving as a member for pressing a lower region of the lumbar vertebrae during forward inclination thereof, and a lower portion thereof serving as a member for pressing the sacral vertebrae during rearward inclination thereof; a first operation handle for inclining the pressure on support board by means of a brake mechanism; and a second operation handle for pivoting the rod by means of another brake mechanism.

15 Claims, 10 Drawing Sheets

SEAT FOR AUTOMOBILE

FIELD OF THE INVENTION:

The present invention relates to a seat for an automobile and, more particularly, to a seat for an automobile having a hip support for supporting the hip region of an occupant of the vehicle.

BACKGROUND OF THE INVENTION

Seats of this type are disclosed in Japanese Utility Model Laid-Open Nos. 174462/1986 and 101850/1984.

The former Japanese Utility Model Laid-Open No. 174462/1986 discloses an arrangement in which a space is defined within a lower portion of a seat back, a hip support being accommodated within the space in such a manner as to be movable in the forward direction about its lower portion serving as a fulcrum, and when an occupant assumes a seated position in which his hip is moved forwardly, the hip support is moved forwardly so as to project outwardly from a front surface of the seat back, thereby allowing the occupant's hip to be supported by means of this projecting portion. With this arrangement however, when the occupant feels that the support of his hip is insufficient, it is necessary for him to rise up and seat himself again after moving the hip support forwardly a predetermined distance.

In the latter Japanese Utility Model Laid-Open No. 101830/1984, an arrangement is disclosed in accordance with which a space is defined within a lower portion of a seat back, a hip support being disposed within the space in such a manner as to be pivotable back and forth with an upper portion thereof serving as a fulcrum, and a seat plate is connected to a lower portion of the hip support by means of a hinge in such a manner as to be movable back and forth upon a seat cushion. With this arrangement, the occupant is seated upon the seat cushion by means of the seat plate. Accordingly, when the occupant feels that the support of his hip is insufficient, it is necessary for the occupant to rise up, move the hip support forward by pulling the seat plate in the forward direction, and then be seated again.

Thus, with the above-described two examples of the prior art, a drawback is encountered in that the occupant cannot adjust the position of the hip support while being seated.

If a lower region of the lumbar vertebrae is supported by means of a hip support, there is an advantage in that general lumbagos can be alleviated. In addition, if the sacral vertebrae are supported, there is an advantage in that the occupant is able to maintain a stable posture by receiving a reactionary force which occurs when he depresses a pedal of the automobile.

However, with the above-described two examples of the prior art, since a predetermined region of the occupant at a fixed height along the spinal column is to be encountered in order to obtain support, there is the problem that unless the occupant assumes an unnatural posture by moving vertically with respect to the seat, he cannot arbitrarily select the region to be acted upon between the lower region of the lumbar vertebrae and the sacral vertebrae.

OBJECTS OF THE INVENTION

Accordingly, an object of the present invention is to provide a seat which allows an occupant of a vehicle to adjust the position of a hip support while being seated, thereby overcoming the above-described drawbacks of the prior art.

Another object of the present invention is to provide a seat for an automobile which allows an occupant of a vehicle to select either the sacral vertebrae or a lower region of the lumbar vertebrae as the region to be supported.

SUMMARY OF THE INVENTION

To these ends, in accordance with the present invention, there is provided a seat comprising: a seat cushion; a seat back connected to the seat cushion, a space being defined within a lower portion thereof; a rod pivotably interposed between opposite side frames of the seat back; a hip support secured upon an intermediate portion of the rod and disposed within the space defined within the seat back; a pressure or support board disposed upon a support frame provided within the hip support, in such a manner as to be pivoted back and forth, whereby an upper portion of the pressure or support board serves as a member for pressing or supporting a lower region of the lumbar vertebrae during forward inclination or pivotal movement thereof, while a lower portion thereof serves as a member for pressing or supporting the sacral vertebrae during a rearward inclination or pivotal movement thereof; a first operation handle for pivoting the pressure or support board by means of a brake mechanism; and a second operation handle for pivoting the rod by means of another brake mechanism.

BRIEF DESCRIPTION OF THE DRAWING

Various other objects, features and advantages of the present invention will become more apparent from the following detailed description of the invention when read in conjunction with the accompanying drawings, in which like reference characters designate like or corresponding parts throughout the several views, and wherein.

Figure 1:
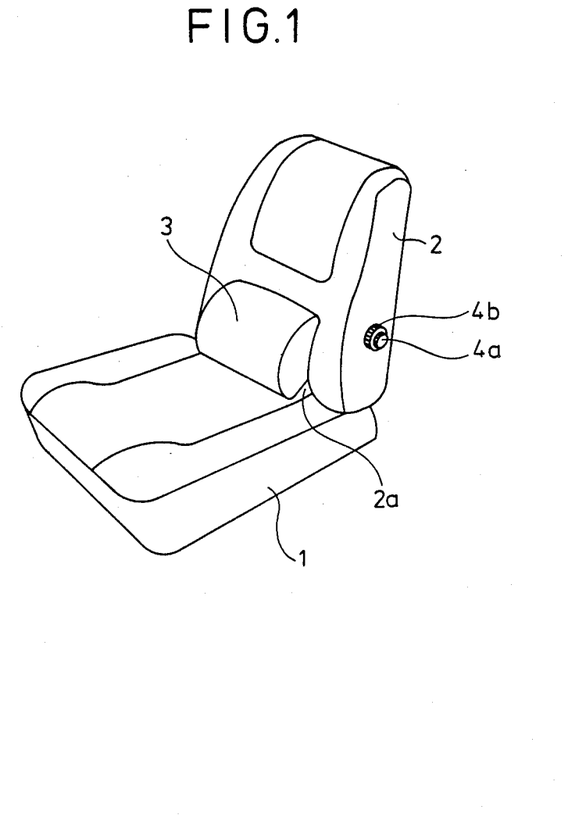
FIG. 1 is a perspective view of an overall arrangement of a seat constructed in accordance with an embodiment of the present invention.

DESCRIPTION OF THE PREFERRED EMBODIMENTS:

Referring now to FIG. 1, a description will be given of an overall arrangement of a seat constructed in accordance with an embodiment of the present invention. A space 2a is formed within a lower portion of a seat back 2 which is connected to a seat cushion 1, and a hip support 3 is disposed within this space 2a. A first operation handle or rotary control knob 4a is provided so as to adjust the vertical position of a support or pressure board (which will be described later) disposed internally within hip support 3. A second operation handle or rotary control knob 4b is similarly provided so as to adjust the back-and-forth position of the hip support 3.

Figure 2:
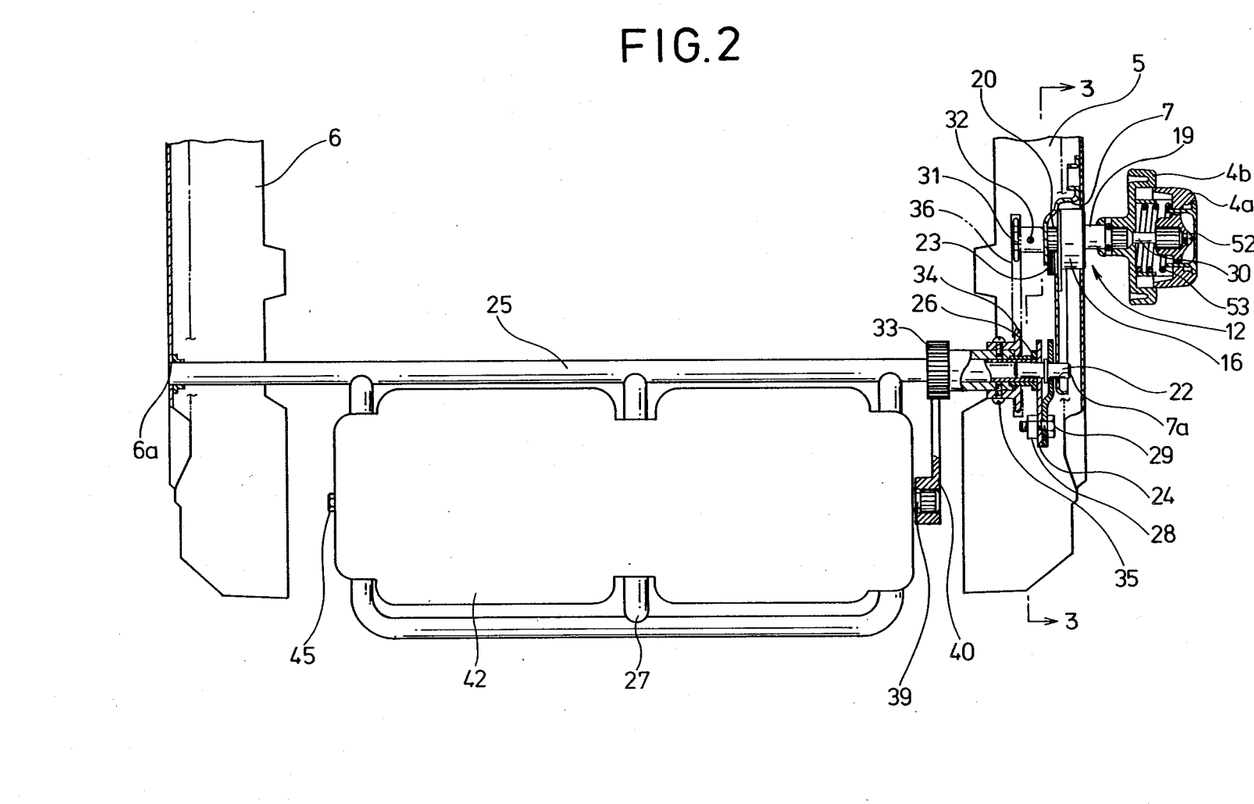
FIG. 2 is a partially cut-away front elevational view illustrating an essential portion of the hip support system of the embodiment shown in FIG. 1.
Figure 3:
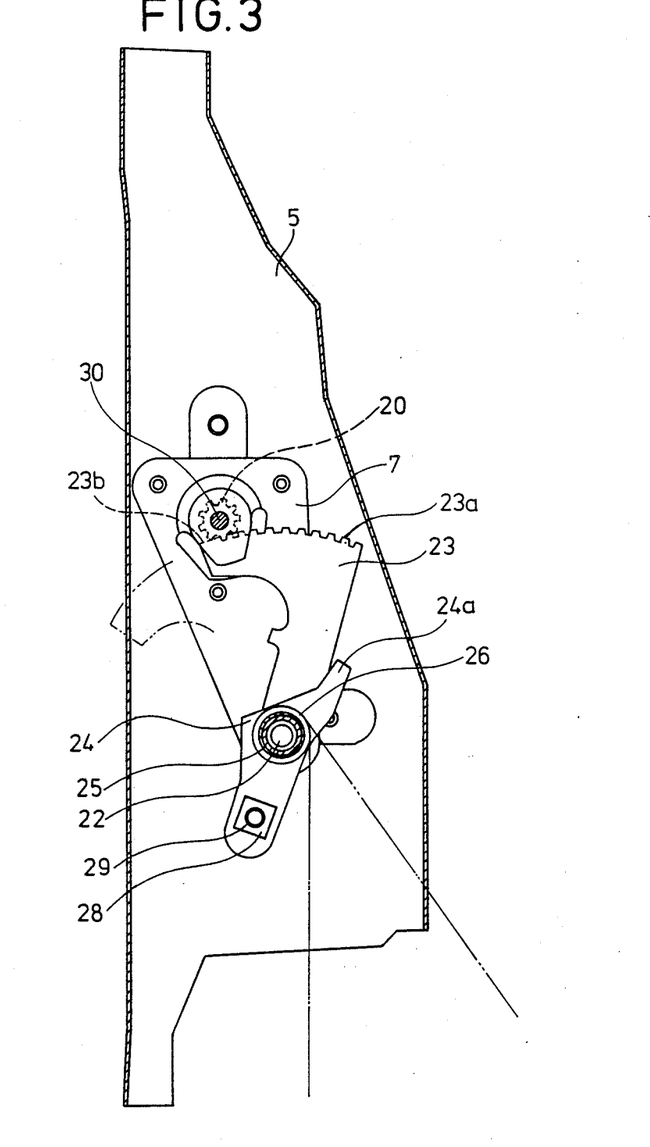
FIG. 3 is a cross-sectional view taken along the line 3—3 of FIG. 2.
Figure 4:
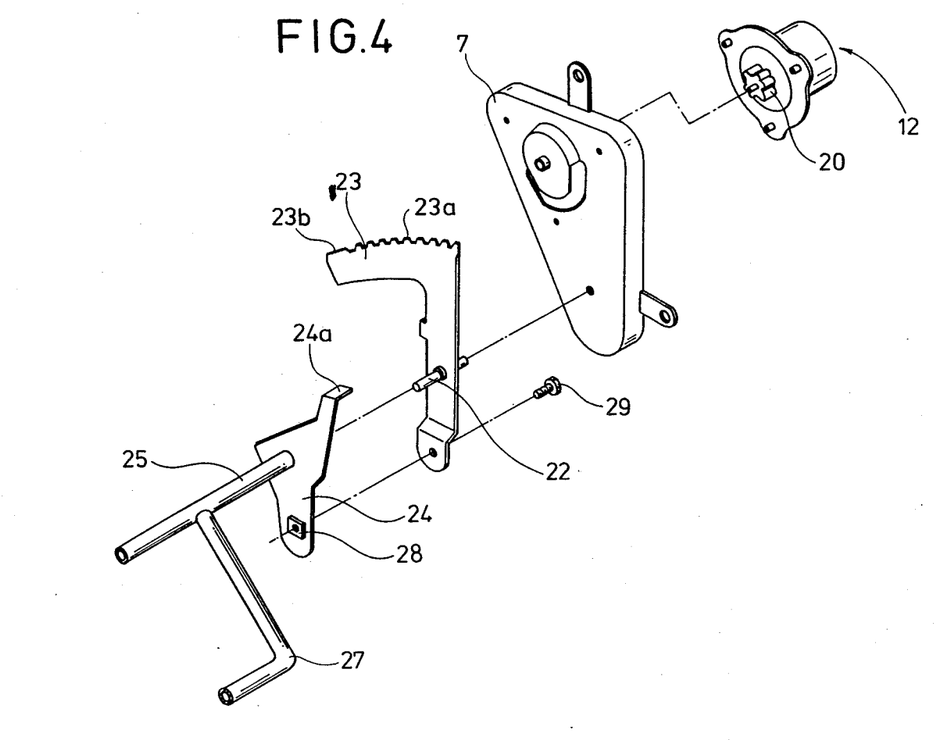
FIG. 4 is an exploded perspective view illustrating an essential portion of the mechanism or system shown in FIG. 2.

Referring now to FIGS. 2–4, a description will be given of a mechanism for adjusting the position of the hip support 3 in its back and forth movement mode. Side frames 5, 6 are respectively disposed upon opposite side portions of the seat back 2. A brake mechanism 12 is attached to one side frame 5 by means of a baseplate 7.

Figure 5:
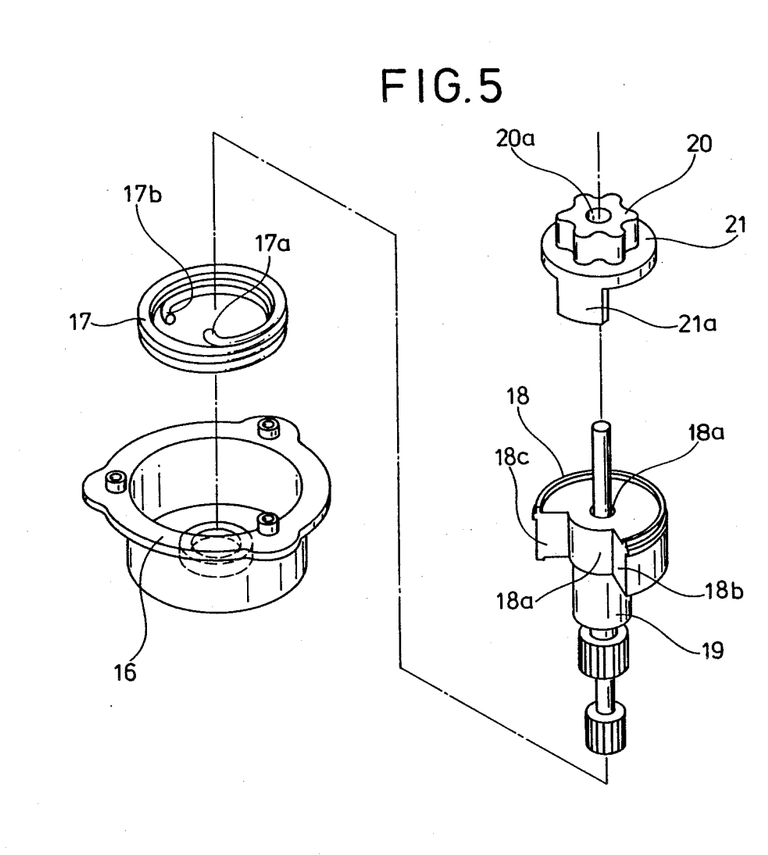
FIG. 5 is an exploded perspective view illustrating a brake mechanism shown in FIG. 2.

A description will now be given of the brake mechanism 12 with reference to FIGS. 5–7. A torsion spring 17 is disposed within a brake housing 16 which is secured to the baseplate 7, in such a manner as to be brought into pressure contact with the inside wall of the brake housing 16. A core 18 provided with a notch 18a is pivotably disposed within the torsion spring 17. In addition, an outer handle shaft 19 upon which the second operation handle 4b is mounted is integrally secured to core 18. Furthermore, a pawl portion 21a of a stopper plate 21 formed integrally with a pinion 20 is disposed within the space comprising notch 18a of the core 18 so as to be interposed between hook portions 17a, 17b of the torsion spring 17. Moreover, a through-hole 18a and a through-hole 20a are respectively provided axially within core 18 and the pinion 20. An inner handle shaft 30 which will be described later is loosely inserted within these through-holes 18a, 20a in such a manner as to be axially movable with respect thereto. Hence, the pinion 20 is rotatable about the axis of the inner handle shaft 30.

Figure 6:
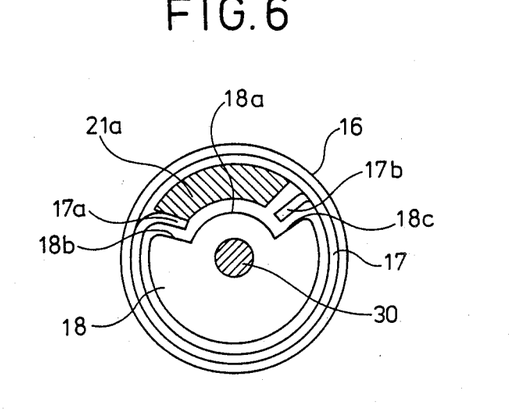
FIGS. 6 and 7 are diagrams illustrating the operation of the brake mechanism shown in FIG. 5.
Figure 7:
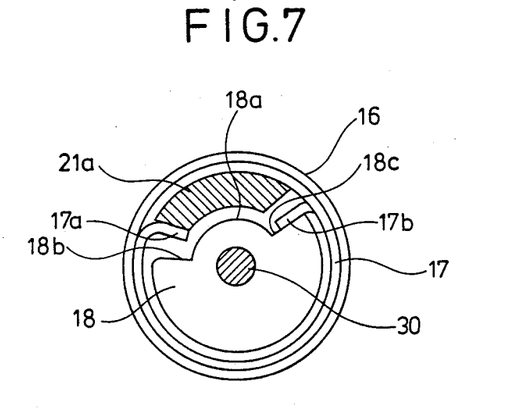
Figure 8:
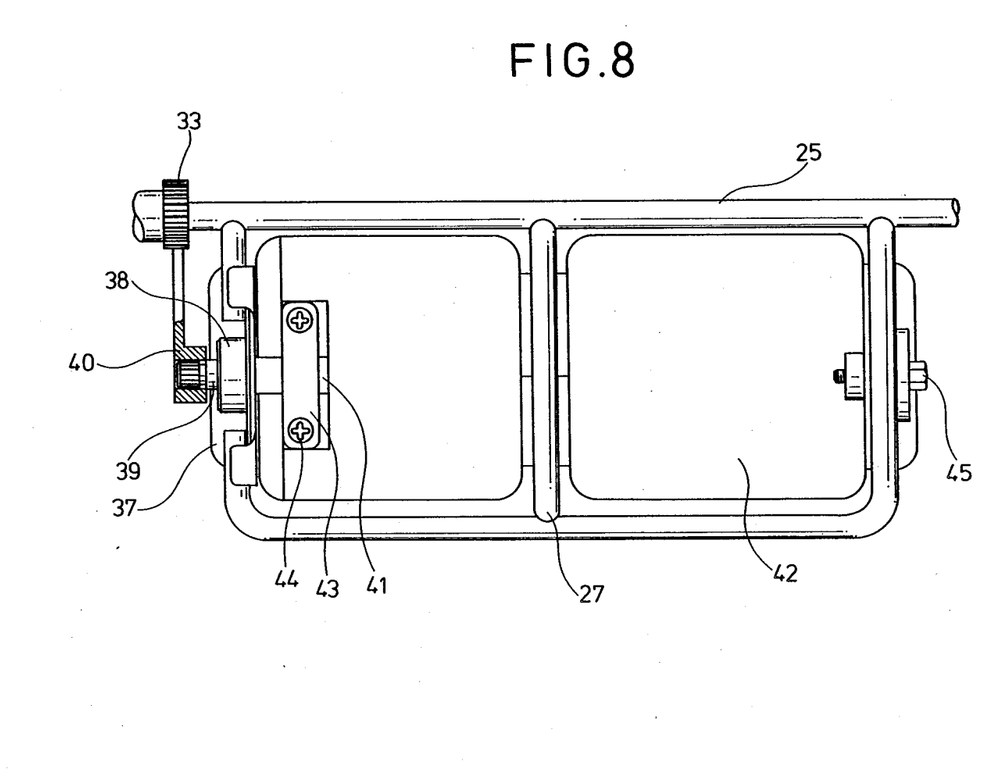
FIG. 8 is a rear view of a pressure or support board and its peripheral portions shown in FIG. 2.
Figure 9:
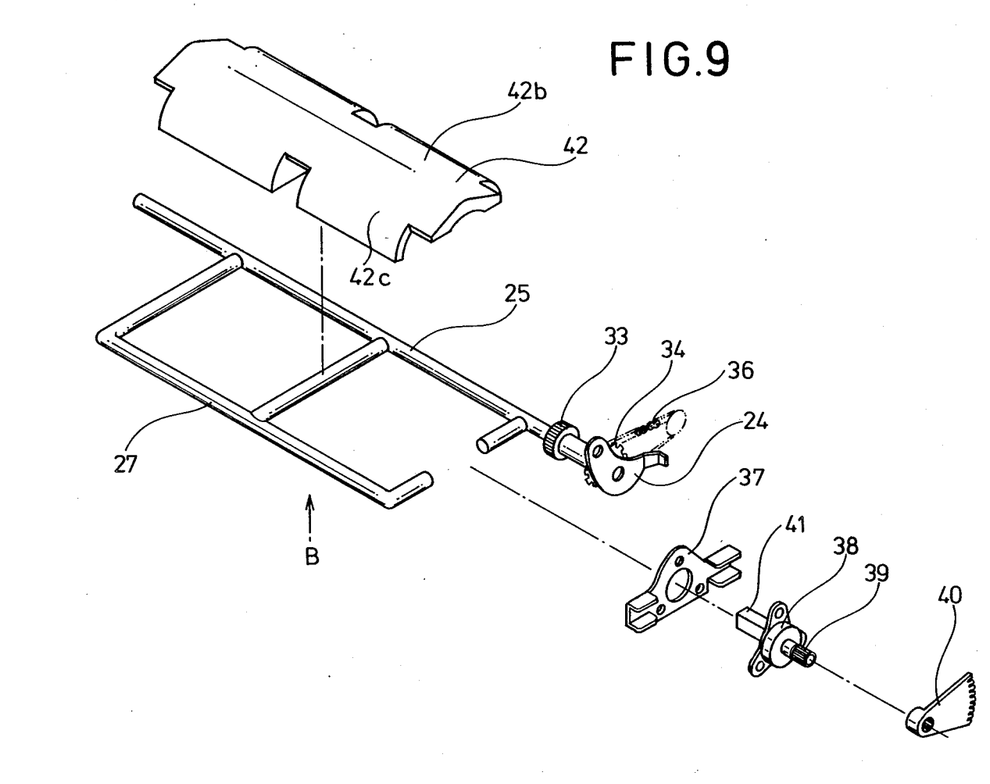
FIG. 9 is an exploded perspective view illustrating the installation of the pressure or support board shown in FIG. 2.
Figure 10:
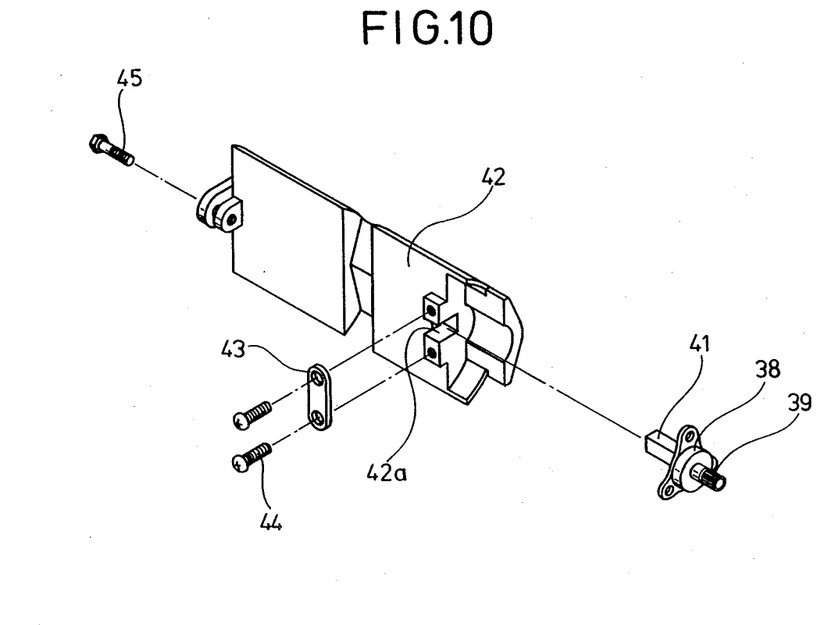
FIG. 10 is a diagram taken in the direction of the arrow B in FIG. 9.

Accordingly, when a rotational force is applied from the pinion 20 side of the brake mechanism, the pawl portion 21a is brought into contact with one of the hook portions 17a or 17b of the torsion spring 17 and impresses the same, as shown in FIG. 6, acting in such a manner as to radially expand the outside diameter of the torsion spring 17. For this reason, the pressure-contacting force acting between the torsion spring 17 and the brake housing 16 increases, with the result that the hook portions 17a, 17b do not move, thereby preventing the rotation of the pinion 20. Meanwhile, when an operating force is applied from the second operation handle 4b (outer handle shaft 19) side of the brake mechanism, since the hook portion 17a or 17b of the torsion spring 17 is subjected, respectively, by means of a side end portion 18b or 18c of the core 18, to a force acting in the direction of contracting the outside diameter of the torsion spring 17, as shown in FIG. 7, the pressure-contacting force acting between the torsion spring 17 and the brake housing 16 decreases. This allows the rotation of the outer handle shaft 19 to be achieved, and the torsion spring 17 is moved by as a result of being pushed by means of one of the core side end portions 18b or 18c, with the result that the pawl portion 21a rotates as a result of being contacted by means of the hook portion 17a or 17b of the torsion spring 17. Hence, the pinion 20 also rotates.

Referring back to FIGS. 2–4, a bore 7a is provided within a lower portion of the baseplate 7. A shaft 22 is pivotably disposed within this bore 7a. A driven sector gear 23 is secured to the shaft 22, and a gear portion 23a thereof meshes with the pinion 20. A non-gear portion 23b is formed at one end portion of the gear portion 23a of driven gear 23 and serves as a stopper for the pivotal movement of the driven gear 23.

A link plate 24 is loosely disposed upon the shaft 22, a stopper arm 24a capable of abutting against a side surface of the baseplate 7 being formed at one pivotable end portion of plate 24. A rod 25 is pivotably interposed between the side frames 5, 6. In other words, one end of the rod 25 is loosely disposed upon the shaft 22, while the other end thereof is loosely disposed within a bore 6a provided within the side frame 6. The end of the rod 25 upon the side frame 5 side is secured to the link plate 24 by means of a rod spacer 26. In addition, an intermediate portion of the rod 25 is disposed within the space 2a defined within the seat back 2, a support frame 27, constituting a core portion of the hip support 3, being secured to this intermediate portion of rod 25.

A weld nut 28 is secured to the other pivotal end portion of the link plate 24. This pivotal end portion of the link plate 24 and the pivotal end portion of the driven gear 23 are connected to each other by means of a bolt 29 which is threadingly engaged with the weld nut 28 in such a manner as to clamp the driven gear 23 therebetween.

Referring now to FIG. 2 and FIGS. 8–10, a description will be given of the pressure or support board and a mechanism associated therewith. The inner handle shaft 30 is loosely disposed within the outer handle shaft 19 in such a manner as to be rotatable with respect thereto. A first sprocket 31 is attached to a distal end portion of this inner handle shaft 30 by means of a screw 32. In addition, a gear shaft 33 is loosely disposed upon an end portion of the rod 25 upon the side frame 5 side in such a manner as to be rotatable with respect thereto. A second sprocket 34 is attached to this gear shaft 33 by means of a screw 35. In addition, a chain 36 is trained between the first and second sprockets 31, 34, so that the rotation of the first sprocket 31 is transmitted to the gear shaft 33.

A brake mechanism 38 is attached to a side portion of the support frame 27 by means of a bracket 37. Since the internal configuration of this brake mechanism 38 is identical with that of the above-described brake mechanism 12, a description thereof will be omitted. Serrations or splines are provided upon a distal end portion of an input shaft 39 of the brake mechanism, and a pivotal proximal end portion of a sector gear 40 meshes with this serrated portion of shaft 39. This sector gear 40 meshes with the gear shaft 33.

A distal end portion of an output shaft 41 of the brake mechanism 38 is substantially formed so as to have the configuration of a square pole. The pressure or support board comprising pressure on contact surfaces at an upper portion 42b and a lower portion 42c, and its sectional configuration is substantially triangular. One side portion of this pressure or support board 42 is pivotably secured to the support frame 27 by means of bolt 45. In addition, a square groove 42a is formed upon the rear surface of the board 42 such that, the output shaft 41 of the brake mechanism 38 is able to be disposed within this square groove 42a and be retained therein by means of a bracket plate 43 which is attached to board 42 by means of screws 44. With respect to board 42, the upper portion 42b functions as a member for contacting a lower region of the lumbar vertebrae during forward inclination or pivotal movement thereof, and the lower portion 42c functions as a member for contacting the sacral vertebrae during rearward inclination or pivotal movement thereof.

The first operation handle 4a is attached to a distal end portion of the inner handle shaft 30 by means of a screw 52 in such a manner as to project axially outwardly from the second operation handle 4b. In addition, a spring 53 is interposed between the first operation handle 4a and the second operation handle 4b, and is adapted to urge the first operation handle 4a and the inner handle shaft 30, away from the side frame 5 until the sprocket 31 is brought into contact with the baseplate 7.

The operation of the above-described arrangement will now be described hereinunder. A description will first be given of a case wherein the hip support 3 is moved back and forth by using the second operation handle 4b. FIGS. 2 and 3 illustrate a state in which the pinion 20 abuts the nongear portion 23b of the driven gear 23, and the hip support 3 is accommodated within the innermost portion of the space 2a of the seat back 2. In this state, if the second operation handle 4b is rotated so as to cause the pinion 20 to rotate clockwise, as viewed in FIG. 3, by means of the brake mechanism 12, the driven gear 23 meshing with the pinion 20 is moved in the counterclockwise direction, as viewed in FIG. 3. In conjunction with the movement of the driven gear 23, the link plate 24 with its pivotal end portion connected to the driven gear 23 also pivots in the counterclockwise direction, as viewed in FIG. 3, about the shaft 22. As the link plate 24 pivots, the rod 25 secured to the link plate 24 also pivots in the counterclockwise direction, as viewed in FIG. 3, which, in turn, causes the support frame 27 to pivotably move in the direction of projecting outwardly from the seat back 2, thereby causing the hip support 3 to project forwardly from the space 2a of the seat back 2. This movement is allowed until the stopper arm 24a of the link plate 24 is brought into contact with the side surface of the baseplate 7, or in other words, until the driven gear 23 moves to the position indicated by means of the two-dotted chain line in FIG. 3. It goes without saying that if the second operation handle 4b is rotated in the reverse direction, the hip support 3 returns to the space 2a within the seat back 2. The back-and-forth position thus adjusted is maintained by virtue of the action of the above-described brake mechanism 12 unless the second operation handle 4b is operated.

A description will now be given hereinunder of the case wherein the support board 42 is inclined by using the first operation handle 4a. If the first operation handle 4a is rotated, the first sprocket 31 rotates by means of the inner handle shaft 30. This rotation causes the sector gear 40 to rotate by means of the chain 36, the second sprocket 34, and the gear shaft 33. As the sector gear 40 rotates, the support board 42 is inclined relative to the support frame 27. If the support board 42 is inclined forwardly, its upper portion 42b projects forwardly, so that a lower region of the lumbar vertebrae located at a higher position along the spinal column can be pressed or supported. On the other hand, if the board 42 is inclined rearwardly, its lower portion 42c projects forwardly whereby the sacral vertebrae located at a lower position along the spinal column can be pressed or supported. The position of the board 42 thus adjusted can be maintained by virtue of the action of the above-described brake mechanism 38 unless the first operation handle 4a is operated.

Figure 11:
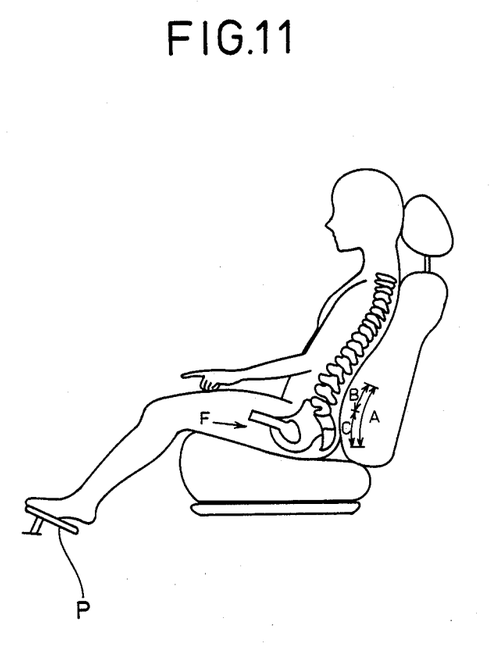
FIG. 11 is a diagram illustrating a region of the human spine to be supported.

In accordance with the above-described arrangement, by rotating the first operation handle 4a so as to cause the pressure or support board 42 to be inclined relative to the support frame 27, the occupant is capable of having a lower region of the lumbar vertebrae or the sacral vertebrae to be selectively supported. Accordingly, as shown in FIG. 11, it is possible to alleviate lumbagos in general by supporting a lower portion B of the lumbar vertebrae with the hip support or to stabilize the occupant's posture when depressing a pedal P by supporting the sacral vertebrae C.

In addition, even while the occupant is seated, it is possible for him to adjust the back-and-forth position of the hip support 3 by operating the second operation handle 4b. In addition, since that adjustment is stepless, it is possible to obtain support for the hip region with a desired strength or support.

Furthermore, in the case of the above-described embodiment, since the first and second operation handles 4a, 4b are provided upon the same axis, the operating efficiency is good. In addition, when the second operation handle 4b is operated, since the palm of the hand is used to press the first operation handle 4a, the first operation handle 4a moves in the direction toward the side frame 5, with the result that the second operation handle 4b can be securely grasped. Moreover, in terms of their external appearance, the two operation handles appear to be one handle, so that an attractive appearance can be obtained.

It should be noted that the present invention is not confined to the above-described embodiments, and various modifications are possible without departing from the spirit of the invention which is defined solely by the accompanying claims. For instance, the cross-sectional configuration of the board 42 may be a circular arc. In addition, a belt and a pulley may be used instead of the chain 36 and the sprockets 31, 34.

What is claimed is:

1. A seat for an automobile, comprising:
    a seat cushion;
    a seat back connected to said seat cushion, a space being formed within a lower portion of said seat back;
    a rod rotatably interposed between oppositely disposed side frames of said seat back;
    a hip support secured upon an intermediate portion of said rod and disposed within said space provided within said seat back;
    a support board disposed upon a support frame provided within said hip support in such a manner as to be pivotably inclined back and forth, an upper portion of said support board serving as a member for engaging a lower region of the lumbar vertebrae of a person seated within said seat during a first inclination of said support board and a forward inclination of said upper portion of said support board, and a lower portion of said support board serving as a member for engaging the sacral vertebrae of said person seated within said seat during a second inclination of said support board and a forward inclination of said lower portion of said support board;
    a first operation handle for inclining said support board by means of a first brake mechanism; and
    a second operation handle for rotating said rod by means of a second brake mechanism so as to move said hip support in a forward and backward mode relative to said space defined within said seat back.

2. A seat for an automobile according to claim 1, wherein:
   said first brake mechanism operatively connected to said first operation handle is attached to said support frame.

3. A seat for an automobile according to claim 2, wherein each one of said brake mechanisms comprises:
   a brake housing;
   a torsion spring disposed inside said brake housing in such a manner as to be brought into pressure contact with an inner wall of said brake housing;
   a core driven by one of said first and second operation handles and provided with a notch, said core being rotatably inserted inside said torsion spring; and
   a stopper plate having a pawl portion inserted and disposed inside the space of said notch of said core between hook portions of said torsion spring in such a manner as to be rotatable about a handle shaft of one of said first and second operation handles.

4. A seat for an automobile according to claim 3, wherein the rotation of said second operation handle is transmitted to said support frame by means of an outer handle shaft, said second brake mechanism in which said core is connected to said outer handle shaft, a pinion connected to said stopper plate of said second brake mechanism, a driven gear meshing with said pinion, a link plate rotatively driven by said driven gear, and said rod connected to said link plate.

5. A seat for an automobile according to claim 4, wherein the rotation of said first operation handle is transmitted to said support board by means of an inner handle shaft rotatably inserted in said outer handle shaft, a first sprocket attached to said inner handle shaft, a gear shaft rotatably mounted upon said rod, a second sprocket attached to said gear shaft, a chain trained between said first and second sprockets, a sector gear meshing with said gear shaft, and said first brake mechanism driven by said sector gear.

6. A seat as set forth in claim 5, wherein:
   said first and second operation handles, and said inner and outer handle shafts, are co-axially disposed with respect to each other.

7. A seat as set forth in claim 5, further comprising:
   a substantially square-shaped recess defined within said support board; and
   a substantially square-shaped output shaft operatively connected to said first brake mechanism.

8. A seat as set forth in claim 7, wherein:
   said first brake mechanism is a one-way type brake mechanism which permits rotation of said first operation handle, said sector gear, and said substantially square-shaped output shaft from a core side of said first brake mechanism, but prevents rotation of said first operation handle, said sector gear, and said substantially square-shaped output shaft from an output shaft side of said first brake mechanism.

9. A seat as set forth in claim 4, wherein:
   said driven gear comprises a sector gear.

10. A seat as set forth in claim 4, wherein:
    said link plate has a projecting end portion for engaging said baseplate so as to limit the movement of said hip support in said forward mode relative to said space defined within said back seat.

11. A seat as set forth in claim 4, wherein:
    said second brake mechanism is a one-way type brake mechanism which permits rotation of said second operation handle, said pinion, and said driven gear from a core side of said second brake mechanism, but prevents rotation of said second operation handle, said pinion, and said driven gear from a pinion side of said second brake mechanism.

12. A seat for an automobile according to claim 1, wherein:
    said second brake mechanism operatively connected to said second operation handle is attached to one of said side frames disposed within said seat back by means of a baseplate.

13. A seat as set forth in claim 1, wherein:
    said support board has a substantially triangular configuration as seen in cross-section.

14. A seat as set forth in claim 1, wherein:
    said support board has a substantially arcuate configuration as seen in cross-section.

15. A seat as set forth in claim 1, wherein:
    said first and second operation handles are disposed at a position which is external to a side portion of said seat back of said seat.

* * * * *